(12) United States Patent  (10) Patent No.: US 7,744,166 B2
Leiter et al.  (45) Date of Patent: Jun. 29, 2010

(54) METHOD FOR OPERATING TO BRAKE GEAR OF A VEHICLE

(75) Inventors: Ralf Leiter, Vallendar (DE); Gregor Poertzgen, Koblenz (DE)

(73) Assignee: Lucas Automotive GmbH (DE)

( * ) Notice: Subject to any disclaimer, the term of this patent is extended or adjusted under 35 U.S.C. 154(b) by 228 days.

(21) Appl. No.: 11/495,232

(22) Filed: Jul. 28, 2006

(65) Prior Publication Data

US 2006/0267402 A1  Nov. 30, 2006

Related U.S. Application Data

(63) Continuation of application No. PCT/EP2005/000878, filed on Jan. 28, 2005.

(30) Foreign Application Priority Data

Jan. 30, 2004  (DE) ...................... 10 2004 004 992

(51) Int. Cl.
  *B60T 13/10*  (2006.01)
  *B60T 13/66*  (2006.01)
(52) U.S. Cl. .......................... 303/20; 303/192; 303/89; 303/16; 188/106 P
(58) Field of Classification Search .............. 303/191, 303/192, 89, 9, 13, 15, 16, 20; 188/106 P, 188/DIG. 2, 72.6
See application file for complete search history.

(56) References Cited

U.S. PATENT DOCUMENTS

| 4,629,043 | A | * | 12/1986 | Matsuo et al. ............... 477/184 |
| 5,505,528 | A | * | 4/1996 | Hamman et al. ............... 303/89 |
| 5,667,282 | A | * | 9/1997 | Kim ............................... 303/3 |
| 6,019,436 | A | * | 2/2000 | Siepker ....................... 303/13 |
| 6,311,808 | B1 | * | 11/2001 | Halasy-Wimmer et al. . 188/72.6 |
| 6,382,741 | B1 | * | 5/2002 | McCann et al. ............. 303/191 |
| 6,449,551 | B1 | | 9/2002 | Wrede |
| 6,481,543 | B1 | * | 11/2002 | Shaw et al. ................. 188/72.6 |
| 6,505,714 | B1 | * | 1/2003 | Ward ......................... 188/72.6 |
| 6,814,414 | B1 | * | 11/2004 | Schmitt et al. ............. 303/191 |
| 6,997,521 | B2 | * | 2/2006 | Jensen et al. .................. 303/15 |
| 7,100,998 | B2 | * | 9/2006 | Holl ............................ 303/191 |
| 7,464,996 | B2 | * | 12/2008 | Saewe et al. .................. 303/89 |
| 2001/0023799 | A1 | | 9/2001 | Engelhard |
| 2006/0186731 | A1 | * | 8/2006 | Bach ............................ 303/89 |

FOREIGN PATENT DOCUMENTS

DE  196 32 863 A1  2/1998

(Continued)

*Primary Examiner*—Thomas J Williams
(74) *Attorney, Agent, or Firm*—MacMillan, Sobanski & Todd, LLC (57) ABSTRACT

A process for operating the brake arrangement of a vehicle is presented, which comprises an electrically controllable service brake system, which is set to generate brake forces independently of driver actuation, and which comprises an electrically controllable parking brake system, which is set to generate brake forces and maintain these forces. So that the parking brake system or its electromechanical actuating unit only needs to cope with relatively small load situations, it is proposed that, when, for certain operating conditions, the parking brake system has to maintain brake forces which are greater than the brake forces it is able to generate itself, the service brake system generates the additionally required brake forces.

7 Claims, 6 Drawing Sheets

FOREIGN PATENT DOCUMENTS

| | | |
|---|---|---|
| DE | 198 35 550 A1 | 2/2000 |
| DE | 198 49 799 A1 | 6/2000 |
| DE | 199 54 284 A1 | 5/2001 |
| DE | 101 04 498 A1 | 8/2002 |
| DE | 101 50 803 A1 | 5/2003 |
| DE | 102 38 870 A1 | 3/2004 |
| JP | 54006241 A * | 1/1979 |
| JP | 54015230 A * | 2/1979 |
| WO | WO 99/38738 | 8/1999 |

* cited by examiner

METHOD FOR OPERATING TO BRAKE GEAR OF A VEHICLE

CROSS-REFERENCE TO RELATED APPLICATIONS

This application is a continuation of International Application No. PCT/EP2005/000878 filed Jan. 28, 2005, the disclosures of which are incorporated herein by reference, and which claimed priority to German Patent Application No. DE 10 2004 004 992.0 filed Jan. 30, 2004, the disclosures of which are incorporated herein by reference.

BACKGROUND OF THE INVENTION

The invention relates to a process for operating the brake arrangement of a vehicle, which brake arrangement comprises an electrically controllable service brake system, which is set to generate brake forces independently of driver actuation, and which comprises an electrically controllable parking brake system, which is set to generate brake forces and maintain these forces.

The service brake system enables the driver to gradually reduce the speed of the vehicle during its operation or to bring the vehicle to a standstill. Modern vehicles are today equipped with an electrically controllable service brake system in order to enable brake functions which are independent of driver actuation, i.e. automatic brake functions, such as drive slip control (ASR) or driving dynamics control (ESP) to be carried out in addition to the anti-locking control function (ABS). To this end, the service brake system comprises, in known manner, a correspondingly constructed electrohydraulic control unit, an electronically controllable brake booster or it is constructed as a so-called "brake-by-wire" system.

By contrast, the parking brake system also enables the vehicle to be held on a road with an incline, and particularly kept stationary when the driver is absent, using mechanical means. The aim today is also to construct the parking brake system such that its electrically controllable, as already known for example as an "electric parking brake (EPB)". With this, the driver only needs to actuate an electrical control element by way of which at least one electromechanical actuating unit is activated to actuate the actual wheel brakes. Whilst, with the so-called "cable puller", only a central electromechanical actuating unit is used, which replaces the conventional parking brake actuating element (lever or pedal) and acts on the wheel brakes concerned in conventional manner by way of cables, there are also EPB systems with generally two peripheral electromechanical actuating units which are constructed or integrated directly on the wheel brakes concerned.

Therefore, DE 101 50 803 A1 discloses a wheel brake which can be hydraulically actuated in conventional manner for the functional range of the service brake system. To this end, the wheel brake has a brake piston which acts on at least one friction lining and can be displaced by means of a hydraulic pressure introduced into a hydraulic chamber to clamp the at least one friction lining against a rotary element connected in torsion-resistant manner to a wheel of the vehicle in order to generate a brake force. So that the functions of the parking brake system can also be carried out, an electromechanical actuating unit is furthermore integrated in the wheel brake, and this has a gear unit driven by an electric motor, which acts on the brake piston in order to clamp and mechanically fix this against the rotary element connected in torsion-resistant manner to a wheel of the vehicle to generate a brake force, to which end the gear unit is of a self-locking construction.

A brake arrangement having a wheel brake such as that known from DE 101 50 803 A1 is disadvantageous in that the electromechanical actuating unit provided for the parking brake system also has to be designed for load situations such as those for which very high brake forces have to be generated and maintained, for example to safely hold a fully loaded vehicle stationary on a road with a gradient of 30% and steeper. The result of this is that the technology of the electromechanical actuating unit has to be relatively complex, making the brake arrangement significantly more expensive.

BRIEF SUMMARY OF THE INVENTION

The object of the invention, therefore, is to provide a process for operating the brake arrangement mentioned above, by means of which the parking brake system or its electromechanical actuating unit only needs to cope with relatively small load situations, in order to prevent the disadvantages mentioned above.

To achieve this object, the process according to the invention proposes that when, for certain operating conditions, the parking brake system has to maintain brake forces which are greater than the brake forces it is able to generate itself, the service brake system generates the additionally required brake forces.

The advantage of the invention is that the brake forces to be generated by the parking brake system can be limited. Limited, for example, to the extent that it is only necessary to cover a simple load situation in which a vehicle with a small load is to be held stationary on a substantially level road. It is thus possible to use an electric motor with relatively low power and a gear unit with a relatively low reduction/transmission ratio for the electromechanical actuating unit, which is not only advantageous in terms of cost but also means that the overall size of the electromechanical actuating unit is reduced to more compact dimensions.

The invention furthermore advantageously makes use of the above-mentioned feature that the gear unit of the electromechanical actuating unit of the parking brake system is of a self-locking construction. As a result, the parking brake system can maintain higher brake forces than it, or its electromechanical actuating unit, is able to generate. Therefore, although the brake forces which can be generated by the parking brake system are limited, it is still suitable for load situations in which a vehicle with a full load, for example, has to be safely held stationary on a road with a gradient of 30% and steeper.

The additionally required brake forces are provided by the service brake system, which is present in any case, with the invention likewise advantageously making use of its above-mentioned feature of being able to generate brake forces automatically, i.e. independently of driver actuation.

Since the service and parking brake systems are electrically controllable, one or more electronic control units are present which detect operating conditions, for example the loaded condition of the vehicle and/or the gradient of the road and/or the temperature of the wheel brakes, by way of corresponding sensor means or mathematical models. There is therefore also the advantage that the additional brake forces to be provided by the service brake system can be variably and individually adjusted according to particular operating conditions or load situations. This has a very favourable effect on the total collective load to be applied by the brake arrangement and, in individual cases, e.g. when the vehicle is to be held stationary on a level road, can even mean that no additional brake forces have to be provided by the service brake system.

It is preferably provided for the service brake system to withdraw the additionally required brake forces after the parking brake system has reached the brake forces which it is able to generate. On the one hand, with the withdrawal of the additionally required brake forces, an increase in the self-locking effect of the parking brake system or its electromotive actuating unit is achieved, which is particularly conducive to safety when the vehicle is to be held stationary for example on a road with a steep gradient. On the other hand, the service brake system is then force-free during the stationary or parking phase of the vehicle, which is a legal stipulation for a hydraulic service brake system owing to the risk of leakages.

Even if the parking brake system can maintain higher brake forces than it is able to generate owing to its self-locking effect, the forces which it, or its electromechanical actuating unit, is able to generate are generally sufficient to overcome the self-locking forces to release the parking brake system. In particular cases, when it is moreover necessary to overcome reaction forces, for example because the vehicle has been parked on a road with a very steep gradient, it is therefore possible to provide for the service brake system to generate predetermined brake forces before the parking brake system withdraws the brake forces maintained by it. Provision can also be made here for the predetermined brake forces to be generated by the service brake system to be variably and individually adjustable according to particular operating conditions, e.g. the loaded condition of the vehicle and/or the gradient of the road.

In principle, it is possible to provide for the brake forces to be generated by the service and parking brake system at the same time when the parking brake system is activated.

In any case, for example in the event that only a relatively small additional brake force component has to be provided by the service brake system, e.g. because the vehicle is unloaded and/or the road has a flat gradient, it is possible to provide for the service brake system to generate the additionally required brake forces after the parking brake system has generated predetermined brake forces.

Likewise, for example in the event that a relatively large additional brake force component has to be provided by the service brake system, e.g. because the vehicle is loaded and/or the road has a steep gradient, it is possible to provide for the service brake system to generate the additionally required brake forces before the parking brake system generates brake forces.

It can furthermore be the case that, when the parking brake system is activated, brake forces are already generated by the service brake. For example because the service brake system is either already actuated by the driver or within the framework of an automatic brake function, such as "hill hold" or "auto-hold", in order to hold the vehicle stationary for example on a road with an incline. In these cases, it is possible to provide for the service brake system to at least maintain brake forces which are in any case already generated as the additionally required brake forces.

It goes without saying that the invention also relates to a brake arrangement of a vehicle which is operated according to the process according to the invention.

Other advantages of this invention will become apparent to those skilled in the art from the following detailed description of the preferred embodiments, when read in light of the accompanying drawings.

DETAILED DESCRIPTION OF THE INVENTION

Figure 1:
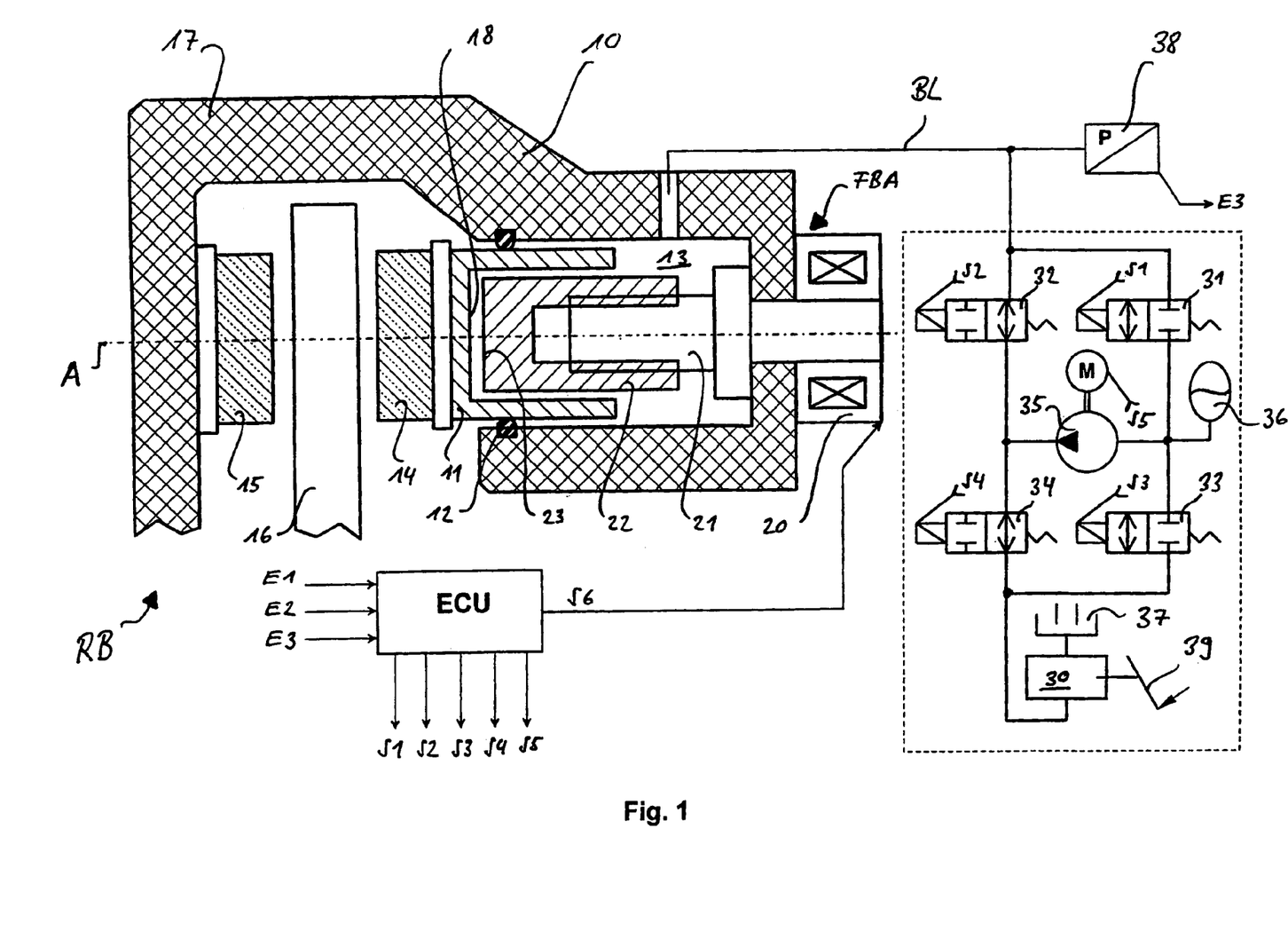
FIG. 1 an exemplary embodiment of a brake arrangement which can be operated according to the process according to the invention.

FIG. 1 shows an exemplary embodiment of a brake arrangement, which can be operated according to the inventive process, for a wheel brake RB. The brake arrangement comprises a service brake arrangement BBA which acts hydraulically on a wheel brake RB by way of a brake line BL. A parking brake system FBA with an electromotive actuating unit is integrated in the wheel brake.

To control/regulate the service and parking brake system, a common electronic control unit ECU is provided, in which, or in the computer unit of which, the inventive process is preferably implemented as software. A person skilled in the art will understand that the service and parking brake system can also be controlled/regulated starting from separate electronic control units, which exchange data by way of a communications system, e.g. CAN-bus.

The wheel brake RB illustrated here in a longitudinal section with reference to its longitudinal axis A has a housing 10 in which a brake piston 11 is received such that it is displaceable coaxially to the longitudinal axis A. A sealing arrangement 12 seals the brake piston 11 with respect to the housing 10 to form a hydraulic chamber 13 in the housing 10. The hydraulic chamber 13 is connected to the brake line BL so that the service brake system BBA can introduce hydraulic pressure for displacing the brake piston 11. The brake piston 11 acts directly on a first friction lining 14 and, by way of a brake calliper 17 constructed on the housing 10, directly on a second friction lining 15 according to the floating calliper principle. Arranged between the first and second friction lining 14, 15, there is a rotary element 16 or a brake disc which (not illustrated in more detail) is connected in torsion-resistant manner to a wheel of the vehicle. If a displacement of the brake piston 11 is effected as a result of a hydraulic pressure introduced into the hydraulic chamber 13, the friction linings 14, 15 are clamped against the side faces of the rotary element 16 to generate a brake force.

The electromotive actuating unit of the parking brake system FBA has an electric motor 20 which can be electrically controlled by the electrical control unit ECU by way of control signals s6. The electric motor 20 drives a gear unit which functions in the manner of a nut/spindle arrangement 21, 22 and by means of which the rotary movement of the electric motor 20 is converted into a longitudinal movement for a control element 23. The control element 23 can be displaced coaxially to the longitudinal axis A, is arranged inside the hydraulic chamber 13 and acts on the base 18 of the brake piston 11. Thus, upon activation of the electric motor 20, a displacement of the brake piston 11 is effected so that, to generate a brake force, the friction linings 14, 15 are clamped against the side faces of the rotary element 16. If the activation of the electric motor 20 is withdrawn or stopped, the brake force generated by clamping the friction linings 14, 15 is mechanically retained since the gear unit functioning in the manner of a nut/spindle arrangement 21, 22 is of a self-locking construction for the parking brake function. A withdrawal of the brake force to release the parking brake function is only possible by re-activating the electric motor 20 in the opposite direction of rotation, during which the control element 23 is moved away from the base 18 of the brake piston 11.

The service brake system BBA illustrated as a hydraulic circuit diagram for a wheel brake RB can be electrically activated by the electronic control unit ECU by way of control signals S1 to S5. Here, the electromagnetically controllable valve arrangements 31 to 34 are each shown in their electrically unactuated starting position. The pump 35 can be controlled by way of an electromotive drive M.

In the event of conventional braking, where the driver actuates a brake pedal 39, a hydraulic pressure is generated in a brake pressure transmitter unit 30 and is introduced into the hydraulic chamber 13 of the wheel brake RB by way of the brake line BL as a result of the open check valves 32 and 34.

In order to modulate the hydraulic pressure introduced into the hydraulic chamber 13, for example for an ABS brake system as a result of a time alternation between pressure reduction, pressure maintaining and pressure build-up phases, the electronic control unit ECU controls the transfer valve 31, the check valve 32 and the pump 35 by way of the control signals S1, S2 and S5 as follows: To reduce the pressure, both the transfer valve 31 and the check valve 32 are activated so that hydraulic fluid admitted into the hydraulic chamber 13 is discharged into the low pressure store 36. To maintain the pressure, only the check valve 32 is activated so that the volume of hydraulic fluid admitted into the hydraulic chamber 13 remains unaltered. To build up the pressure, neither the transfer valve 31 nor the check valve 32 is activated, so that hydraulic fluid is again admitted into the hydraulic chamber 13. During the pressure modulation, the pump 35 is at least sometimes activated to convey hydraulic fluid which has been discharged into the low pressure store 36 back into the brake line BL.

To perform automatic brake functions, i.e. brake functions which are independent of driver actuation, such as ESP, the electronic control unit ECU firstly activates the transfer valve 33, the check valve 34 and the pump 35 by way of the control signals S3, S4 and S5. Thus, the suction side of the pump 35 is connected to the reservoir 37 of the brake pressure transmitter unit 30 so that it can remove hydraulic fluid there to introduce it into the hydraulic chamber 13 of the wheel brake RB by way of the brake line BL as a result of the open check valve 32. If pressure modulation is also required here, this can take place as described above on the part of the electronic control unit ECU by further activating the transfer valve 31 and the check valve 32 by way of the control signals S1 and S2.

Information relating to the operating conditions of the vehicle which is collected by corresponding sensor means (not illustrated in more detail) is supplied by way of input signals E1 to the electronic control unit ECU for processing. This includes the speeds of the rotary elements 16 or the associated wheels of the vehicle to detect, amongst other things, whether the vehicle is stationary, the gradient of the road on which the vehicle is to be held stationary, and the loaded condition of the vehicle. A person skilled in the art will understand that some sensor means, e.g. gradient sensors, can also be integrated in the electronic control unit to gain advantages in terms of costs and susceptibility to failure.

By way of the input signals E2, a corresponding control means (not illustrated), which can be operated by the driver, informs the electronic control unit ECU that the activation of the parking brake system FBA is desired to hold the vehicle stationary. Moreover, within the framework of a "hill hold" or "auto hold" function, it is also possible to activate the parking brake system FBA independently of the will of the driver, i.e. automatically, for example when, after a particular time period has been exceeded, the vehicle is no longer to be held stationary by the service brake system BBA but by the parking brake system FBA.

It is also optionally possible to provide a pressure sensor 38 which detects the pressure generated in the hydraulic chamber 13 or brake line BL and communicates this to the electronic control unit ECU by way of input signals E3. The pressure generated in the hydraulic chamber 13 is namely proportional to the brake force which is generated when the friction linings 14, 15 are clamped against the side faces of the rotary element 16 and is therefore of a level relevant for regulating/controlling the brake arrangement. In addition, or when a pressure sensor 38 is not present, the brake force can be determined by mathematical models. In the parking brake system FBA, this is based for example on the power input of the electric motor 20; in the service brake system BBA this is based for example on evaluation of the activation times for the valve arrangements 31 to 34 and the pump 35.

Figure 2:
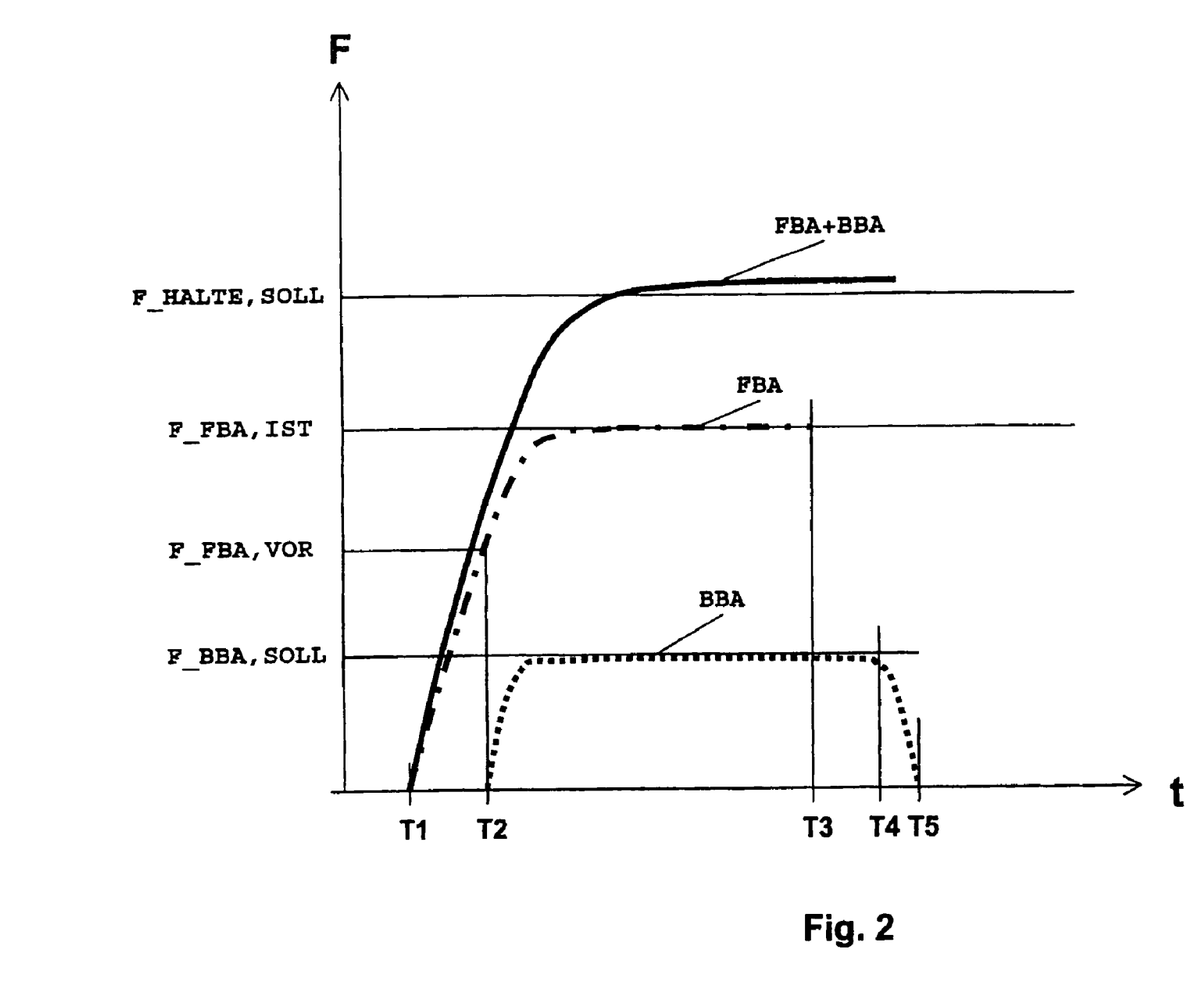
FIG. 2 a force/time graph of a first exemplary embodiment of the process according to the invention upon actuation of the parking brake system.

FIG. 2 shows a first exemplary embodiment of the process according to the invention upon actuation of the parking brake system with reference to a force/time graph. At the time T1, the activation of the parking brake system FBA is requested so that this begins to build up a brake force electromechanically, which is limited to a value F_FBA,IST as illustrated in the dot-and-dash curve. In the interval between the times T1 and T2, the electronic control unit ECU evaluates the current operating condition (load, gradient of the road, etc.) of the vehicle to determine the brake force F_HALTE,SOLL, which is at least necessary for holding the vehicle stationary for this operating condition. Since the necessary brake force F_HALTE,SOLL is greater here than the brake force F_FBA, IST which can be generated by the parking brake system FBA itself, the additionally required brake force F_BBA,SOLL is generated hydraulically by automatically activating the service brake system BBA, as illustrated in the dotted curve. To keep the actuating time as brief as possible, the time T2 can be selected shortly after the time T1 and can be dependent, for example, on whether the parking brake system FBA has generated a predetermined brake force F_FBA,VOR which is smaller than or equal to the brake force F_FBA,IST (F_FBA, VOR<=F_FBA,IST) which can be generated by the parking brake system FBA itself. The additional brake force component F_BBA,SOLL is variable and is substantially the result of the (absolute) difference between the necessary brake force F_HALTE,SOLL and the brake force F_FBA,IST which can be generated, which is preferably increased to be safe, for example by adding a value F_OFFSET. This consequently gives:

$$F\_BBA,SOLL = |F\_HALTE,SOLL - F\_FBA,IST| + F\_OFFSET,$$

or, by multiplication with a value F_FAKTOR, which is greater than one (F_FAKTOR>1.0), this consequently gives $$F\_BBA,SOLL = |F\_HALTE,SOLL - F\_FBA,IST| * F\_FAKTOR.$$

The result of this is that the overall brake force generated on the rotary element 16 runs somewhat above the threshold for the necessary brake force F_HALTE,SOLL, as illustrated in the continuous curve. At the time T3, the activation of the parking brake system FBA is withdrawn which, owing to the gear unit 21, 22 being of a self-locking construction, has no influence on the overall brake force. The same applies when, at the time T4, i.e. after the parking brake system FBA has reached the brake forces which it is able to generate, the activation of the service brake system BBA is withdrawn. Here, the hydraulic fluid which was previously admitted into the hydraulic chamber 13 is discharged so that the wheel brake RB remains hydraulically set without force in the stationary or parking phase beginning at time T5.

Figure 3:
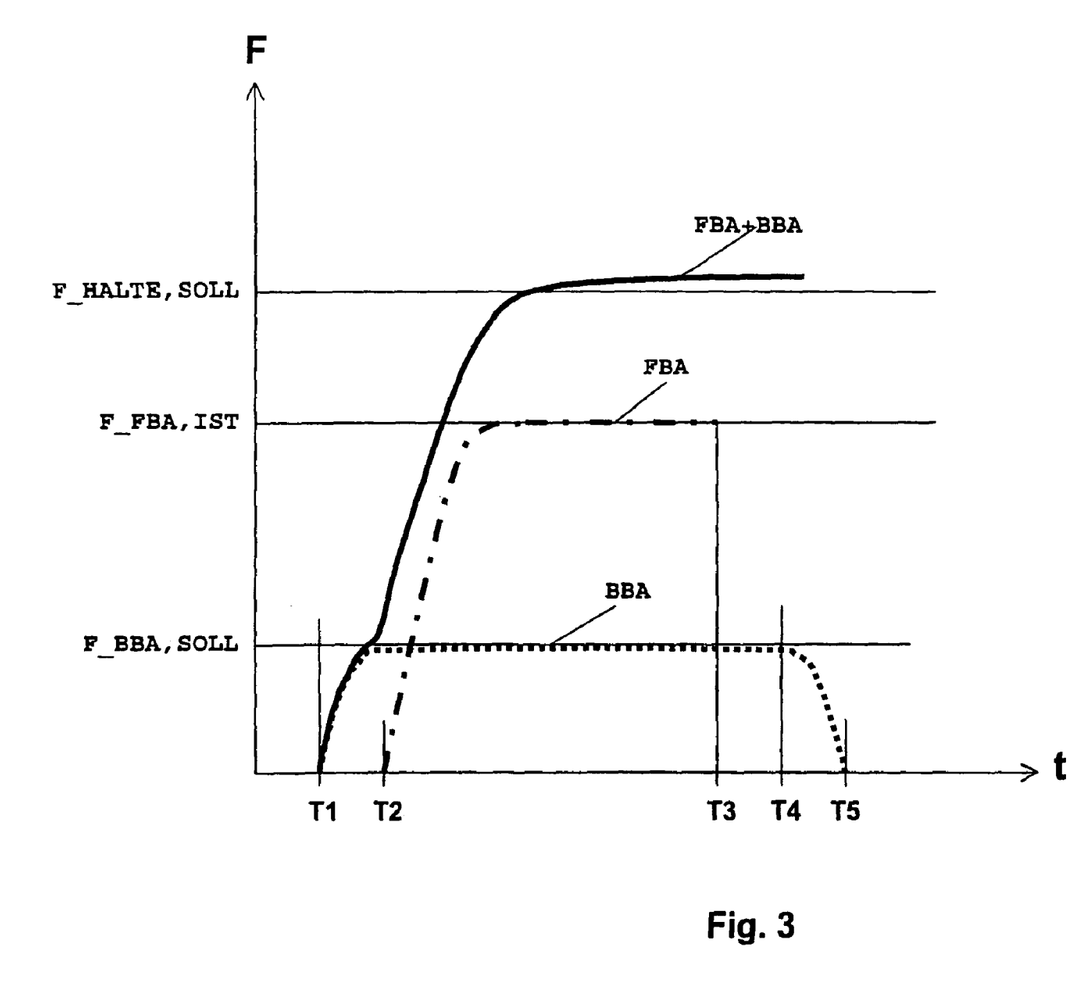
FIG. 3 a force/time graph of a second exemplary embodiment of the process according to the invention upon actuation of the parking brake system.

In the second exemplary embodiment shown in FIG. 3, the additionally required brake force F_BBA,SOLL is hydraulically generated upon a request for activation of the parking brake system FBA at time T1 by automatically activating the service brake system BBA, as illustrated in the dotted curve. Then, at time T2, the brake force F_BBA,IST is built up electromechanically by the parking brake system FBA, as illustrated in the dot-and-dash curve, to produce the overall brake force on the rotary element 16 (as illustrated in the continuous curve), which is somewhat above the threshold for the necessary brake force F_HALTE,SOLL (as shown in FIG. 2). As shown in FIG. 2, the activation of the parking brake system FBA is also withdrawn here at the time T3 and the activation of the service brake system BBA is withdrawn at the time T4, without this effecting the curve for the overall brake force for the reasons mentioned above.

Figure 4:
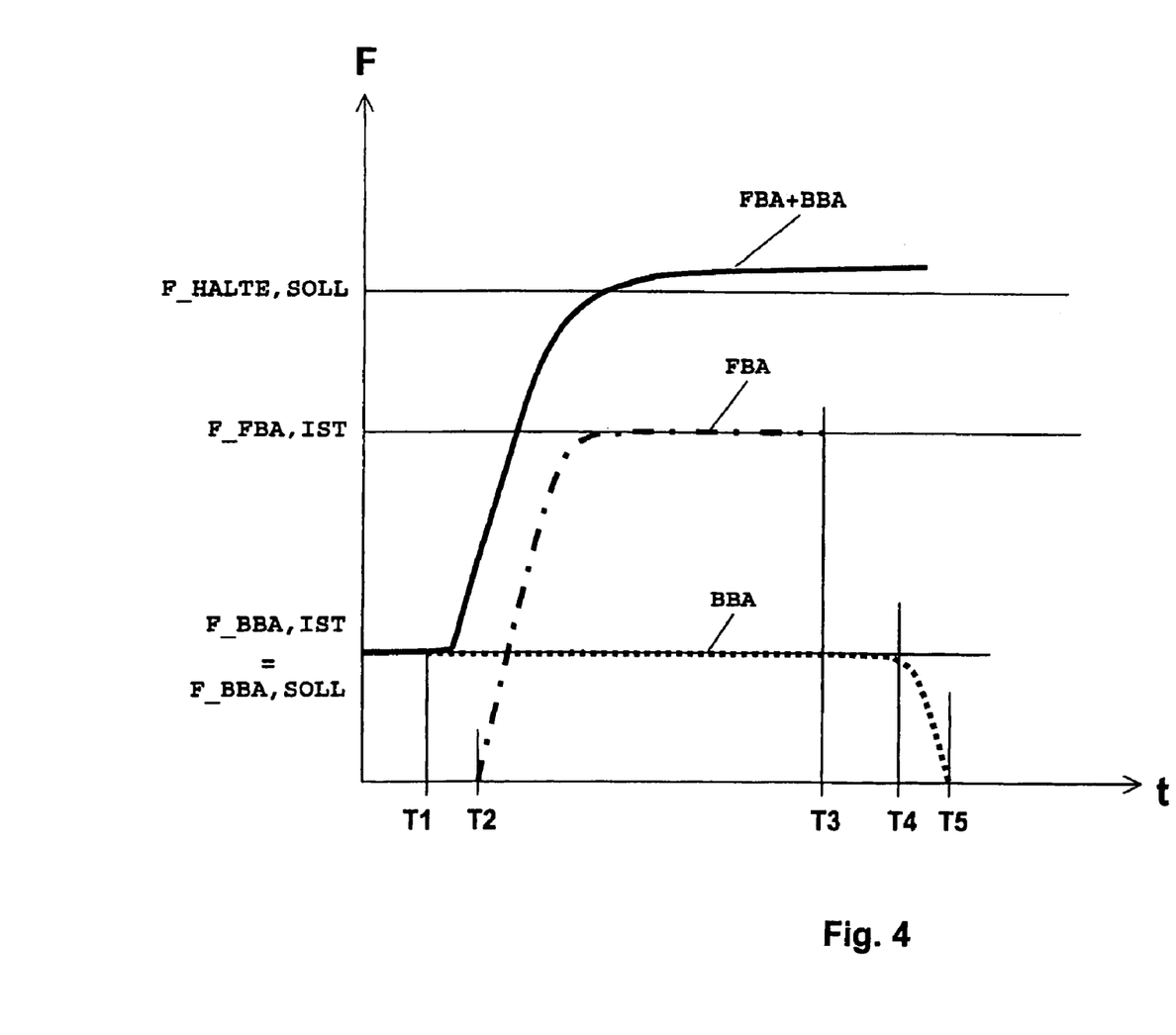
FIG. 4 a force/time graph of a third exemplary embodiment of the process according to the invention upon actuation of the parking brake system.

The third exemplary embodiment shown in FIG. 4 shows the case when, before the request for activation of the parking brake system FBA at the time T1, a brake force F_BBA,IST, is already hydraulically initiated by the service brake system BBA, be it because the driver has actuated the brake pedal 39 and/or because an automatic brake function, e.g. "hill hold" or "auto hold" is executed. Here, the brake force F_BBA,IST which is generated in any case by the service brake system BBA is maintained as an additionally required brake force F_BBA,SOLL from the time T1. Otherwise, the process is effected analogously to FIG. 3.

Figure 5:
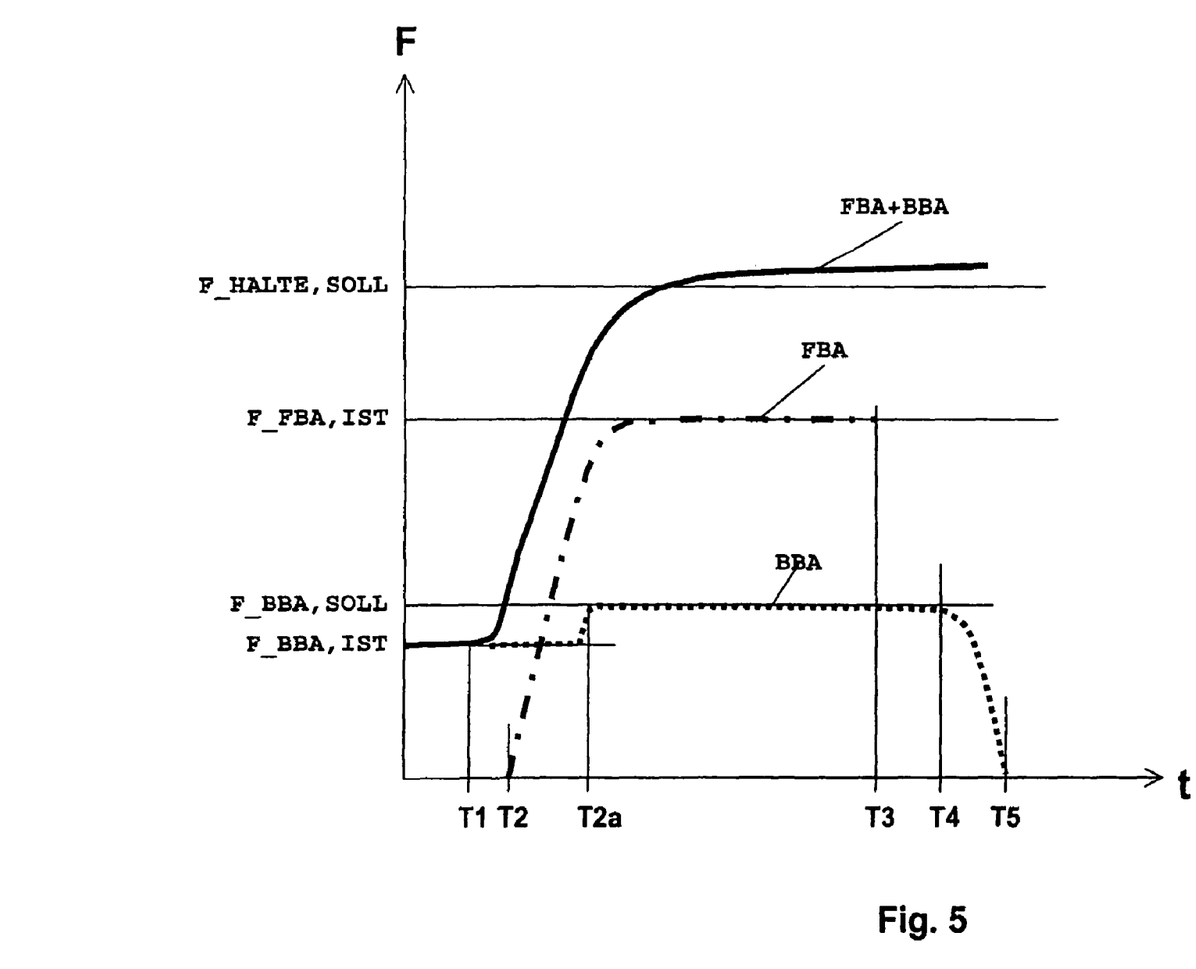
FIG. 5 a force/time graph of a fourth exemplary embodiment of the process according to the invention upon actuation of the parking brake system.

By contrast with FIG. 4, the fourth exemplary embodiment according to FIG. 5 shows the case when the brake force F_BBA,IST generated in any case by the service brake system BBA is not sufficient as an additionally required brake force. Therefore, by automatically activating the service brake system BBA, as illustrated in the dotted curve, there is an increase in the hydraulic brake force component to F_BBA,SOLL at the time T2a. Otherwise the process is effected analogously to FIG. 3 or 4.

Figure 6:
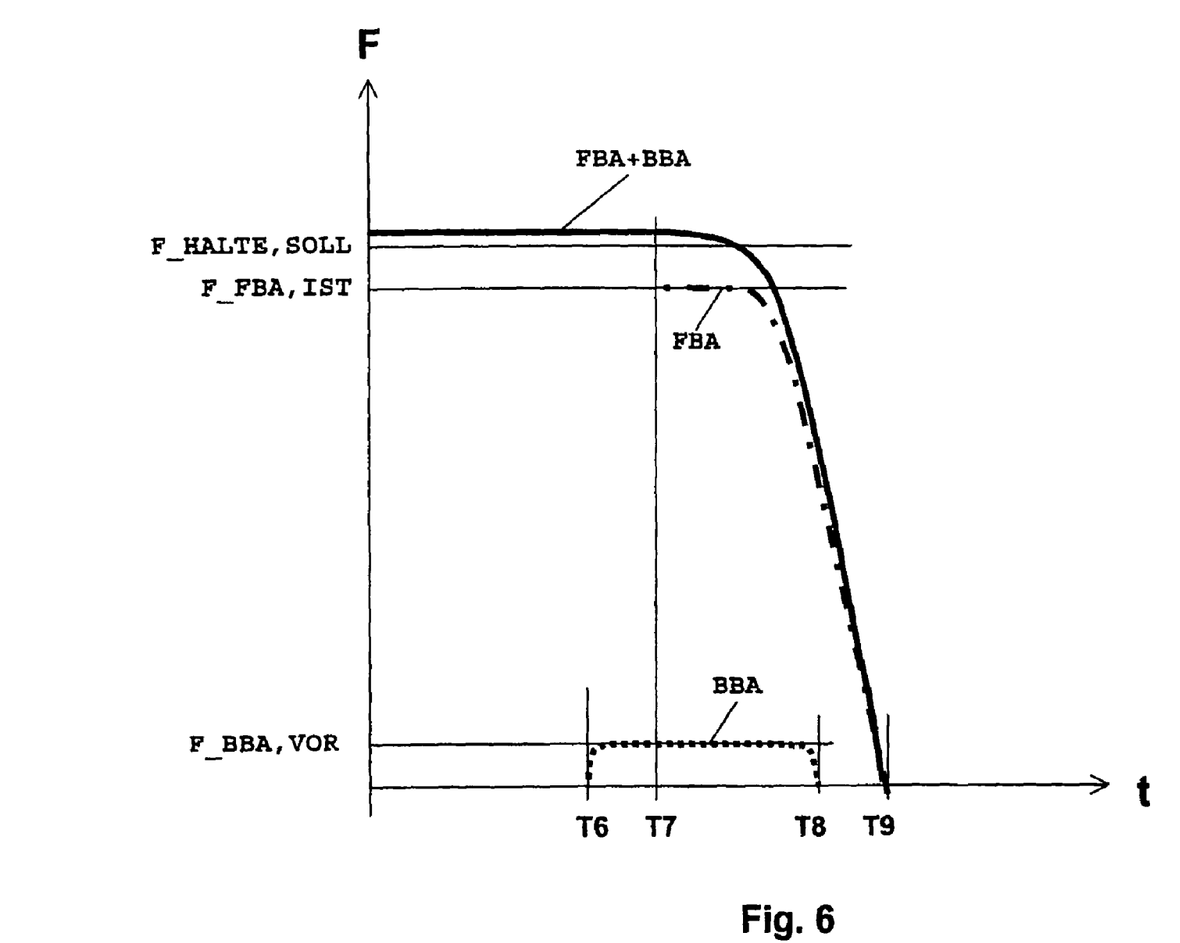
FIG. 6 a force/time graph of an exemplary embodiment of the process according to the invention when the parking brake system is released, these being simplified schematic illustrations and the reference numerals used each denoting the same components and having the same significance.

With reference to a force/time graph, FIG. 6 shows an exemplary embodiment of the process according to the invention when the parking brake system is released. It is assumed here that the vehicle is in the stationary or parked phase, which begins according to FIGS. 2 to 5 from the time T5. At the time T7, if there is a request to withdraw the parking brake system FBA, the electromechanical brake force component is withdrawn, as illustrated in the dot-and-dash curve, as a result of which the overall brake force acting on the rotary element 16 decreases as illustrated in the continuous curve until the wheel brake RB is again set such that it is completely, i.e. electromechanically and hydraulically, without force from the time T9. If, to withdraw the electromechanical brake force component, it is necessary to overcome self-locking forces, then it can be optionally provided for a predetermined brake force F_BBA,VOR to be generated at the time T6 by the service brake system BBA before the parking brake system begins to withdraw the brake forces maintained by it, as illustrated in the dot-and-dash curve. The predetermined brake force F_BBA,VOR is then preferably withdrawn at the time T8, i.e. before the overall force acting on the rotary element 16 has dropped completely. It also applies for the predetermined brake force F_BBA,VOR that, if at all necessary, it can be variably adjusted according to the current operating condition (load, gradient of the road, etc.).

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. A process for operating a brake arrangement of a vehicle comprising the steps of:
   (a) providing an electrically controllable service brake system which is operable to generate brake forces independently of driver actuation by urging a service brake piston and fiction lining against a brake disc, and an electrically controllable parking brake system, which is operable to generate brake forces and maintain these forces, the electric parking bake system including an electric motor and gear unit that function in the manner of a nut and spindle arrangement to urge the service brake piston and friction lining toward the brake disc;
   (b) initially actuating the electric parking brake system;
   (c) determining during the initial activation of the electric parking brake system is activated, whether or not the parking brake system has to maintain brake forces for holding the vehicle stationary which are greater than the brake forces the parking brake is able to generate itself;
   (d) activating the service brake system during the initial activation of the electric parking brake system upon determining that the brake forces needed to hold the vehicle stationary are greater than the brake forces the parking brake is able to generate itself, to generate the additionally required brake forces by further urging said service brake piston and fiction lining against a brake disc with the service brake system; and
   (e) maintaining the brake forces generated as a whole by both the parking brake system and service brake system with only the parking brake system by advancing the nut and spindle arrangement with the electric motor to hold the further urging of the service brake piston and fiction lining against the brake disc.

2. Process according to claim 1, wherein the service brake system withdraws the additionally required brake forces after the parking brake system nut and spindle arrangement has been advanced to maintain the brake forces generated as a whole by both the parking brake system and the service brake system.

3. Process according to claim 1 wherein the service brake system generates predetermined brake forces before the parking brake system withdraws the brake forces maintained by it.

4. Process according to claim 1, wherein the service brake system generates the additionally required brake forces after the parking brake system has generated predetermined brake forces.

5. Process according to claim 1, wherein the service brake system generates the additionally required brake forces before the parking brake system generates brake forces.

6. Process according to claim 1, wherein the service brake system at least maintains brake forces which are already generated in any case as the additionally required brake forces.

7. Brake arrangement of a vehicle comprising:
   an electrically controllable service brake system, which is operable to generate brake forces independently of driver actuation by urging a service brake piston and friction lining against a brake disc, and
   an electrically controllable parking brake system, which is operable to generate brake forces and maintain these forces, the parking brake system including an electric motor and gear unit that function in the manner of a nut and spindle arrangement to urge the service brake piston and friction lining toward the brake disc, the parking brake system also being operable to maintain brake forces which are greater than the brake forces the parking brake system is able to generate itself, in which case during an initial application of the parking brake and upon determining that the parking brake system has to maintain brake forces for holding the vehicle stationary which are greater than the brake forces it is able to generate itself, the service brake system can be controlled in such a way that it is activated during the initial application of the parking brake and generates the additionally required brake forces by further urging the service brake piston and friction lining against the brake disc and only the parking brake system then maintains the brake forces generated as a whole by the parking brake system and service brake system by advancing the nut and spindle arrangement with the electric motor to hold the further urging of the service brake piston and friction lining against the brake disc.

\* \* \* \* \*

UNITED STATES PATENT AND TRADEMARK OFFICE
CERTIFICATE OF CORRECTION

PATENT NO. : 7,744,166 B2  Page 1 of 1
APPLICATION NO. : 11/495232
DATED : June 29, 2010
INVENTOR(S) : Ralf Leiter et al.

It is certified that error appears in the above-identified patent and that said Letters Patent is hereby corrected as shown below:

On the Title Page, Item [54], Title: delete "TO" and insert --THE--.

Col. 1, Line 1, delete "TO" and insert --THE--.

Signed and Sealed this

Thirty-first Day of August, 2010

David J. Kappos
*Director of the United States Patent and Trademark Office*